(12) United States Patent
Rivera et al.

(10) Patent No.: US 10,511,239 B2
(45) Date of Patent: *Dec. 17, 2019

(54) SYSTEMS AND METHODS FOR CONTROLLING SINUSOIDALLY DRIVEN MOTORS

(71) Applicant: Crestron Electronics, Inc., Rockleigh, NJ (US)

(72) Inventors: Luis J. Rivera, Dumont, NJ (US); Michael Campagna, Woodcliff Lake, NJ (US); Benjamin Slivka, Hillsdale, NJ (US)

(73) Assignee: Crestron Electronics, Inc., Rockleigh, NJ (US)

(*) Notice: Subject to any disclaimer, the term of this patent is extended or adjusted under 35 U.S.C. 154(b) by 101 days.

This patent is subject to a terminal disclaimer.

(21) Appl. No.: 15/800,675

(22) Filed: Nov. 1, 2017

(65) Prior Publication Data

US 2019/0131894 A1 May 2, 2019

(51) Int. Cl.
| | |
|---|---|
| *H02P 23/12* | (2006.01) |
| *H02P 6/15* | (2016.01) |
| *H02P 6/16* | (2016.01) |
| *H02P 6/21* | (2016.01) |
| *E06B 9/72* | (2006.01) |
| *E06B 9/68* | (2006.01) |

(52) U.S. Cl.
CPC ............ *H02P 6/153* (2016.02); *E06B 9/68* (2013.01); *E06B 9/72* (2013.01); *H02P 6/16* (2013.01); *H02P 6/21* (2016.02); *E06B 2009/6809* (2013.01); *E06B 2009/6845* (2013.01); *H02P 2205/07* (2013.01); *H02P 2209/11* (2013.01)

(58) Field of Classification Search
CPC .... H02P 6/153; H02P 6/21; H02P 6/16; H02P 2205/07; H02P 2209/11; E06B 9/72; E06B 2009/6809; E06B 2009/6845
USPC ...................................... 318/400.14
See application file for complete search history.

(56) References Cited

U.S. PATENT DOCUMENTS

| | | | |
|---|---|---|---|
| 4,229,821 A * | 10/1980 | de Jager | H04L 27/2017 |
| | | | 375/280 |
| 5,041,749 A | 8/1991 | Gaser et al. | |
| 5,057,753 A | 10/1991 | Leuthold et al. | |

(Continued)

OTHER PUBLICATIONS

Digi-Key's North American Editors, Why and How to Sinusoidally Control Three-Phase Brushless DC Motors, Jan. 17, 2017, available at www.digikey.com/en/articles/techzone/2017/jan/why-and-how-to-sinusoidally-control- three-phase-brushless-dc-motors.

*Primary Examiner* — Bickey Dhakal
*Assistant Examiner* — Gabriel Agared
(74) *Attorney, Agent, or Firm* — Crestron Electronics, Inc.

(57) ABSTRACT

An angle shift compensation system and method for controlling a sinusoidally driven motor to achieve efficient motion and reduced noise. The motor controller uses the angle shift compensation method to monitor the angle shift between a sinusoidal motor control signal configured to drive the motor and a feedback signal received from at least one position detector indicating the position of the motor rotor with respect to the motor stator. In response, the motor controller proportionally adjusts the amplitude of the motor control signal based on the monitored angle shift to maintain the angle shift substantially equal to an angle shift threshold.

36 Claims, 8 Drawing Sheets

(56) References Cited

U.S. PATENT DOCUMENTS

| | | | |
|---|---|---|---|
| 5,659,272 A * | 8/1997 | Linguet | H03C 1/50 |
| | | | 332/151 |
| 6,836,090 B2 | 12/2004 | Sugiyama et al. | |
| 7,423,396 B2 | 9/2008 | Bolt | |
| 7,626,348 B2 * | 12/2009 | Cartier | E05F 15/60 |
| | | | 318/135 |
| 8,686,674 B2 | 4/2014 | Bi et al. | |
| 8,698,446 B2 * | 4/2014 | Venkataraman | H02P 6/182 |
| | | | 318/799 |
| 2001/0010355 A1 * | 8/2001 | Umemura | G01N 23/046 |
| | | | 250/282 |
| 2006/0052960 A1 * | 3/2006 | Guevremont | G01R 19/2506 |
| | | | 702/106 |
| 2017/0131124 A1 * | 5/2017 | Novak | G01D 18/008 |

* cited by examiner

SYSTEMS AND METHODS FOR CONTROLLING SINUSOIDALLY DRIVEN MOTORS

BACKGROUND OF THE INVENTION

Technical Field

Aspects of the embodiments relate generally to sinusoidally driven motors, and more specifically to systems, methods, and modes for controlling sinusoidally driven motors to achieve efficient motion and reduced noise.

Background Art

Motorized window treatments provide a convenient one-touch control solution for screening windows, doors, or the like, to achieve privacy and thermal effects. Various types of motorized window treatments exist, including motorized roller shades, inverted rollers, Roman shades, Austrian shades, pleated shades, blinds, shutters, skylight shades, garage doors, or the like. A typical motorized window treatment includes a shade material that is manipulated by the motor to cover or uncover the window.

Such motorized applications require high performance motors capable of being driven with the least amount of audible noise possible, while maintaining stable velocity, position control, and energy efficiency. Generally, two types of motor controls are utilized, including linear and nonlinear.

In linear control, the controller directly controls the motor via a control signal. Linear control methods may employ some type of linear mathematical compensator that is fine-tuned with the internal parameters of the system being controlled. A linear system operates without any awareness of extraneous factors. When these methods are implemented using the digital domain, they will have certain impulse reactions when unexpected physical transients occur, such as friction, component wear, changes in temperature, and changes in load. While these types of controllers offer system reliability, including in torque output and efficiency, they create speed oscillations that cause audible noise. These speed oscillations can also be observed visually, when for example amplified by a bouncing shade.

Nonlinear control systems modify the output by changes in the input using feedback. These types of systems undertake some dynamic subtleties under certain operating regions, but can potentially get complex to implement and difficult to guarantee total convergence under all the variable operating space. In most cases these systems have no better yield in audible noise than the linear control systems.

For example, referring to FIG. 1, there is shown a simplified depiction of a brushless direct current (BLDC) motor 101. A BLDC motor 101 comprises a rotor 102 having a driving shaft 103 and a permanent magnet 104 divided into one to eight north (N)-south (S) pole pairs. A stator 107 is position about the rotor 102 that generally comprises a plurality of steel laminations that carry phase windings 105a-c defining the stator pole pairs. The BLDC motor 101 operates via electrical commutation generated by a controller 110. Commutation is the process of switching current in the phases in order to generate motion. Current is run through the phase windings 105a-c in alternating directions in a sequence such that the permanent magnet poles follow the revolving magnetic field that is caused by the windings.

To determine the timing of the current running through the phase windings 105a-c, Hall Effect sensors 106a-c are generally placed around the rotor 102 for each phase control to track the position of the rotor 102 and provide feedback to the controller 110. Speed of the rotor 102 is determined by the time interval between signals from the Hall Effect sensors 106a-c. One control scheme for electronic commutation involves sinusoidal commutation. Typically, the controller 110 outputs three sinusoidal waveforms at 120 degrees out of phase across the three phases of the motor 101, as shown in FIG. 2. The phase angle of these sinusoidal waveforms depends on the position of the rotor 102 as reported by the Hall Effect sensors feedback. To maintain constant output speed, as more load is exerted on the motor 101, the controller 110 may change the frequency of the sinusoidal waveform, and thereby change the speed of the motor 101, based on speed errors reported by the Hall Effect sensors 106a-c. Problems can occur if the Hall Effect sensor placement is not accurate with respect to the rotor 102 causing a constant lag and shift in the sinusoidal waveform. This results in falsely detected instantaneous speed changes, timing errors, and torque ripple.

When analyzing the components of an audibly perceived system, the most common trait is the combination of different frequency components with a spread of intensities. For motorized devices and applications, the focus is mainly on frequencies under 1 kHz where most perturbing noises are found. While investigating and researching the source of these frequencies, multiple sources were found that are generic enough to affect many motorized systems. The main sources being the commutation frequency, timing corrections, and the sporadic rate of speed compensation that is generated by the linear and nonlinear behavior of the control algorithms driving the motor control.

Accordingly, a need has arisen for systems, methods, and modes for controlling sinusoidally driven motors to achieve efficient motion and reduced noise without effecting the frequency or speed of the motor.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for motor control that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments a motor control system is provided comprising a motor, at least one position detector, and a controller for controlling the motor. The motor includes a rotor and a stator and comprises at least one phase. The at least one position detector is adapted to detect a position of the rotor with respect to the stator and generate a feedback signal. For at least one motor phase, the controller is adapted to: drive the motor phase with a sinusoidal motor control signal; receive a feedback signal from the at least one position detector; determine an angle shift between the motor control signal and the feedback signal; compare the angle shift to an angle shift threshold; when the angle shift is below the angle shift threshold, decrease an amplitude of the motor control signal; and when the angle shift is above the angle shift threshold, increase the amplitude of the motor control signal.

According to an embodiment, the at least one position detector comprises at least one selected from a position sensor, a Hall Effect sensor, a magnetic position sensor, a resolver, an encoder, an optical encoder, a magnetic encoder, a current sense circuit, a voltage sense circuit, a back electromotive force (EMF) sense circuit, and any combinations thereof.

According to an embodiment, the controller is further adapted to maintain the motor control signal at a fixed frequency. According to a further embodiment, on startup of the motor the controller is further adapted to ramp up a frequency of the motor control signal from a startup frequency to the fixed frequency. The controller may not change a frequency of the motor control signal based on the feedback signal from the at least one position detector. The controller may be adapted to determine a fixed frequency of the motor control signal according to a reference speed. The controller may be further adapted to change the fixed frequency to a new fixed frequency upon receiving a command indicating a new reference speed. The controller may change the fixed frequency by gradually ramping up or ramping down the frequency from the original fixed frequency to the new fixed frequency.

According to another embodiment, the controller is further adapted to determine a new angle shift between the motor control signal and the feedback signal by weighing the determined angle shift with respect to a new angle shift measurement. According to one embodiment, the controller is adapted to determine the angle shift using a weighted average estimation. The controller may proportionally decrease or increase the amplitude of the motor control signal based on the determined angle shift. According to an embodiment, the controller may decrease or increase the amplitude of the motor control signal using at least one of a linear algorithm, a non-linear algorithm, a proportional-Integral (PI) algorithm, a proportional-integral-derivative (PID) algorithm, a fuzzy logic algorithm, or any combinations thereof.

According to an embodiment, the controller is further adapted to generate the motor control signal in response to a command to move the motor.

According to one embodiment, the controller is further adapted to:

generate the motor control signal at a set maximum amplitude value; and drive the motor phase by decreasing the amplitude of the motor control signal based on the determined angle shift until reaching the angle shift threshold. According to one embodiment, the maximum amplitude value may comprise a predetermined maximum amplitude value. According to another embodiment, the controller may be further adapted to determine the maximum amplitude value based on a previously converged to amplitude.

According to one embodiment, the controller is further adapted to perform a startup sequence for the at least one motor phase comprising: generate the sinusoidal motor control signal comprising a startup point; initially, drive the motor phase by gradually ramping up voltage until reaching the startup point in the motor control signal; and drive the motor phase from the startup point according to the sinusoidal motor control signal. According to another embodiment, the controller is further adapted to perform a startup sequence for the at least one motor phase comprising: generate the sinusoidal motor control signal at a set amplitude and comprising a startup point, wherein the startup point comprises a startup amplitude; determine a ramping curve with amplitude that increases from an initial amplitude to the startup amplitude; drive the motor phase according to the ramping curve until reaching the startup point; and drive the motor phase from the startup point according to the generated sinusoidal motor control signal.

According to one embodiment, the set amplitude value comprises a predetermined amplitude value. According to another embodiment, the controller is further adapted to determine the set amplitude value based on a previously converged to amplitude. According to one embodiment, the startup amplitude comprises a predetermined startup amplitude value. According to another embodiment, the startup amplitude is determined from a detected load. The controller may be further adapted to determine the startup point based on previously detected position by the at least one position detector. The startup point may define a startup angle shift in the sinusoidal motor control signal. The ramping curve may comprise a function of increasing voltage from the initial amplitude to the startup amplitude during a predetermined time period. The ramping curve may comprise at least one of a linear ramping curve, a non-linear ramping curve, a positive logarithmic curve, a negative logarithmic curve, and any combinations thereof. According to an embodiment, the initial amplitude may comprise zero. According to another embodiment, the initial amplitude comprises a nominal value greater than zero.

According to an embodiment, the angle shift threshold may comprise a value greater than zero. The angle shift threshold may comprise a sum of a predetermined minimum angle shift and a calibration angle shift. The minimum angle shift may comprise a range of about 15 degrees of one electrical rotation to about 25 degrees of one electrical rotation. The calibration angle shift may be an estimated measurement of the at least one position detector misplacement with respect to the rotor. The controller may be further adapted to calibrate the motor control system to determine the angle shift threshold by: driving the motor phase with no load using a control signal at a set maximum amplitude value; receiving a feedback signal from the at least one position detector; determining a calibration angle shift between the motor control signal at the maximum amplitude and the feedback signal; and determining the angle shift threshold by adding the calibration angle shift to a predetermined minimum angle shift value. According to a further embodiment, the controller may determine the calibration angle shift by continuously measuring angle shifts between the motor control signal at the maximum amplitude and the feedback signal for a convergence period and correlating the measured angle shifts.

According to another aspect of the embodiments, a motor control system is provided comprising a motor, at least one position detector, and a controller for controlling the motor. The motor includes a rotor and a stator and comprises at least one phase. The at least one position detector is adapted to generate a feedback signal indicating a position of the rotor with respect to the stator. For at least one motor phase, the controller is adapted to: generate a sinusoidal motor control signal at a maximum amplitude value; receive a feedback signal from the at least one position detector;

determine an angle shift between the motor control signal and the feedback signal; compare the angle shift to an angle shift threshold; decrease the amplitude of the motor control signal based on the determined angle shift until reaching the angle shift threshold; and monitor the angle shift between the motor control signal and the feedback signal and proportionally adjust the amplitude of the motor control signal to maintain the angle shift substantially at the angle shift threshold.

According to a further aspect of the embodiments, a motor control system is provided comprising a motor, at least one position detector, and a controller for controlling the motor. The motor includes a rotor and a stator and comprises at least one phase. The at least one position detector generates a feedback signal indicating a position of the rotor with respect to the stator. For at least one motor phase, the controller is adapted to: drive the motor phase with a sinusoidal motor control signal; monitor an angle shift between the motor control signal and the feedback signal; and proportionally adjust an amplitude of the motor control signal based on the monitored angle shift to maintain the angle shift substantially equal to an angle shift threshold.

According yet to a further aspect of the embodiments a motor control system is provided comprising a motor, at least one position detector, and controller for controlling the motor. The motor includes a rotor and a stator and comprises a plurality of phases. The position detector is adapted to detect a position of the rotor with respect to the stator and generate a feedback signal. For at least one motor phase the controller is adapted to: generate a sinusoidal motor control signal comprising a startup point determined based on previously detected potion by the at least one position detector; drive the motor phase by gradually ramping up voltage until reaching the startup point in the motor control signal; and drive the motor phase from the startup point according to the sinusoidal motor control signal.

According to another aspect of the embodiments a motor control system is provided comprising a motor, at least one position detector, and a controller for controlling the motor. The motor includes a rotor and a stator and comprises at least one phase. The at least one position detector is adapted to detect a position of the rotor with respect to the stator and generate a feedback signal. For at least one motor phase, the controller is adapted to: generate a sinusoidal motor control signal at a set amplitude and comprising a startup point, wherein the startup point comprises a startup amplitude; determine a ramping curve with amplitude that increases from an initial amplitude to the startup amplitude; drive the motor phase according to the ramping curve until reaching the startup point; and drive the motor phase from the startup point according to the generated sinusoidal motor control signal.

According to one embodiment, the set amplitude comprises a predetermined amplitude value. According to another embodiment, the controller is further adapted to determine the set amplitude based on a previously converged to amplitude. According to one embodiment, the startup amplitude comprises a predetermined startup amplitude value. According to another embodiment, the startup amplitude is determined from a detected load. The controller may be further adapted to determine the startup point based on previously detected position by the at least one position detector. The startup point may define a startup angle shift in the sinusoidal motor control signal. The ramping curve may comprise a function of increasing voltage from the initial amplitude to the startup amplitude during a predetermined time period. The ramping curve may comprise at least one of a linear ramping curve, a non-linear ramping curve, a positive logarithmic curve, a negative logarithmic curve, and any combinations thereof. The initial amplitude may comprise zero or a value greater than zero. According to one embodiment, the motor may comprise a plurality of phases, wherein the startup point for each phase comprises a different startup amplitude, and wherein the controller is adapted to determine the ramping curve for each phase such that the plurality of phases arrive at their respective startup amplitudes at the same time. According to another embodiment, the motor may comprise a plurality of phases, wherein the controller is adapted to determine a single ramping curve and control the plurality of the phases according to the single ramping curve such that the plurality of phases arrive at their respective startup amplitudes at different times.

According to further aspect of the embodiments a method is provided for controlling a motor comprising the steps of: driving a motor phase of the motor with a sinusoidal motor control signal; receiving a feedback signal from at least one position detector indicating a position of a rotor with respect to a stator of the motor; determining an angle shift between the motor control signal and the feedback signal; comparing the angle shift to an angle shift threshold; when the angle shift is below the angle shift threshold, decreasing an amplitude of the motor control signal; and when the angle shift is above the angle shift threshold, increasing the amplitude of the motor control signal.

According to another aspect of the embodiments a method is provided for controlling a motor comprising the steps of: driving a motor phase of the motor with a sinusoidal motor control signal; receiving a feedback signal from at least one position detector indicating a position of a rotor with respect to a stator of the motor; monitoring an angle shift between the motor control signal and the feedback signal; and proportionally adjusting an amplitude of the motor control signal based on the monitored angle shift to maintain the angle shift substantially equal to an angle shift threshold.

According to yet a further aspect of the embodiments a method is provided for controlling a motor phase of a motor comprising the steps of: generating a sinusoidal motor control signal comprising a startup point based on previously detected potion of a rotor of the motor with respect to a stator of the motor; driving the motor phase by gradually ramping up voltage until reaching the startup point in the motor control signal; and driving the motor phase from the startup point according to the sinusoidal motor control signal.

According to another aspect of the embodiments a method is provided for controlling a motor phase of a motor comprising the steps of: generating a sinusoidal motor control signal at a set amplitude and comprising a startup point, wherein the startup point comprises a startup amplitude; determining a ramping curve with amplitude that increases from an initial amplitude to the startup amplitude; driving the motor phase according to the ramping curve until reaching the startup point; and driving the motor phase from the startup point according to the generated sinusoidal motor control signal.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
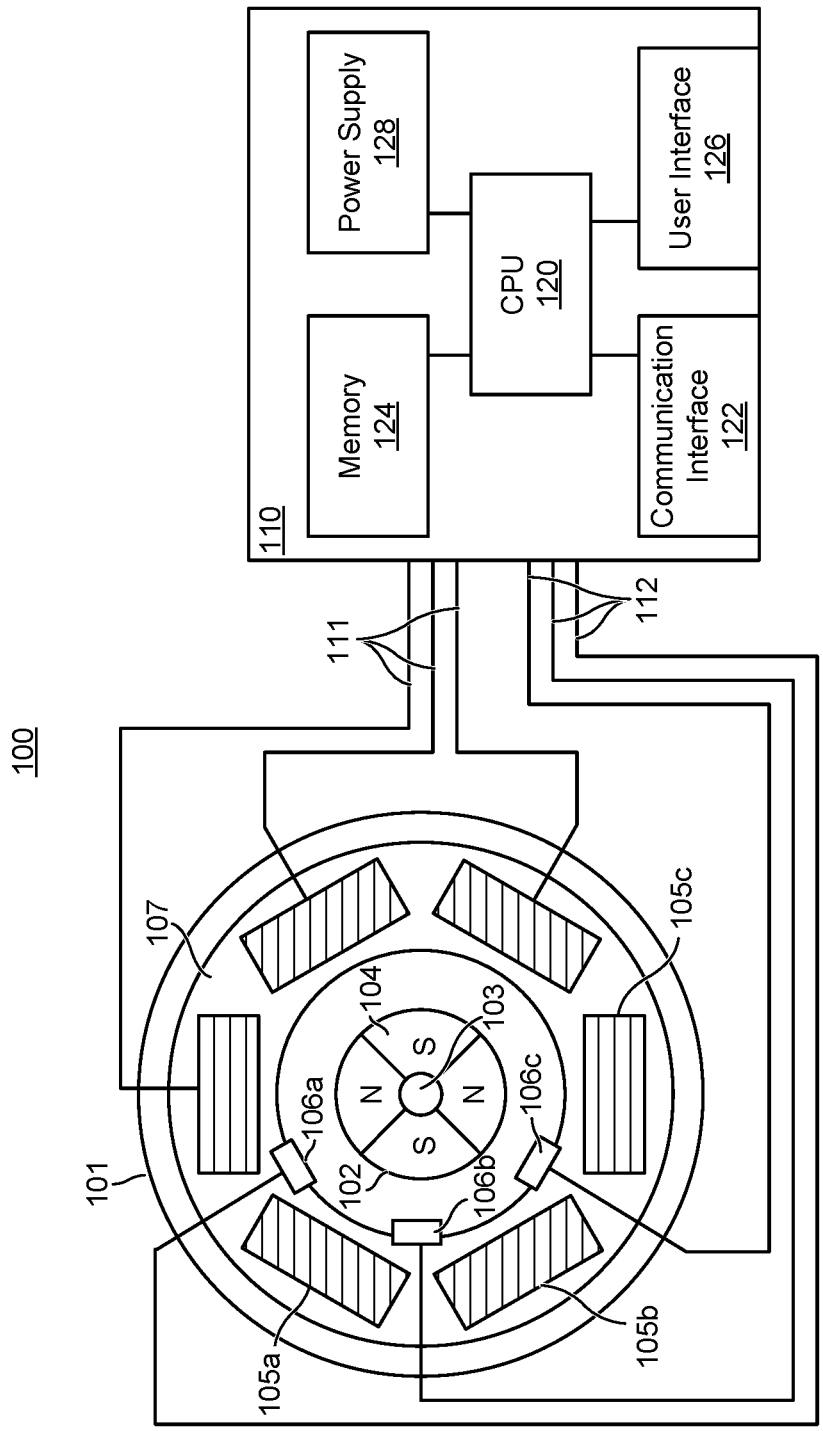

FIG. 1 illustrates a simplified depiction of a motor system according to an illustrative embodiment.

Figure 2:
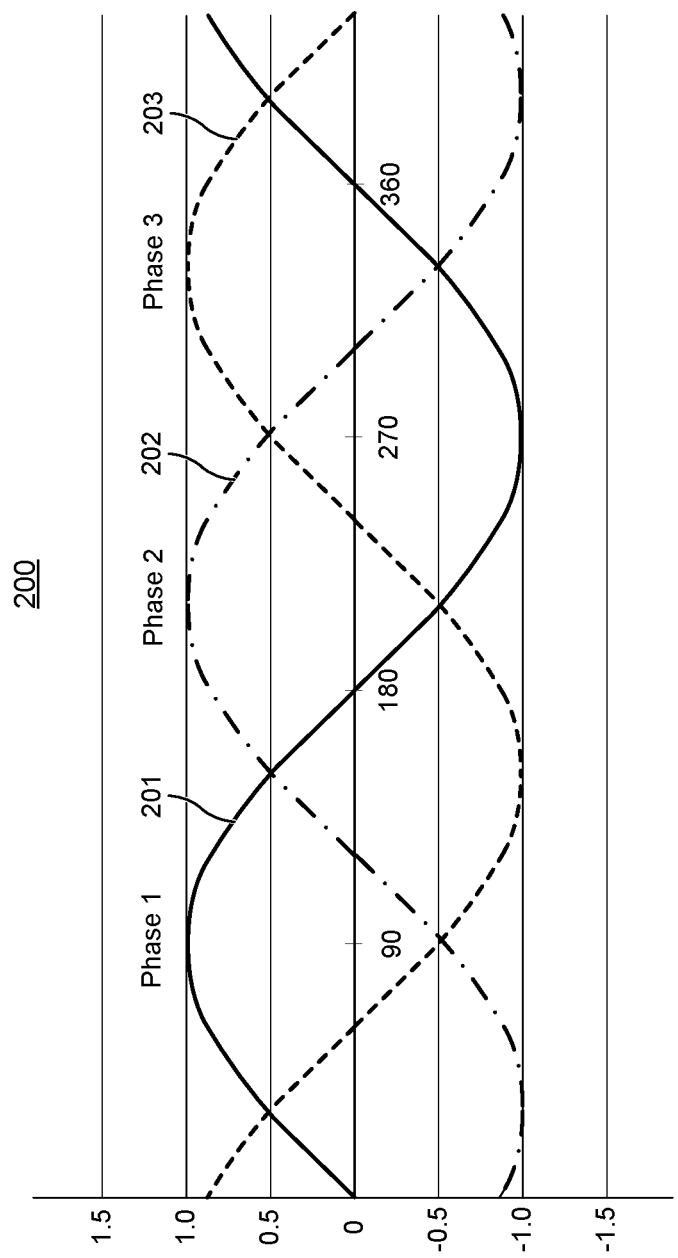

FIG. 2 illustrates a three phase sinusoidal waveform of a motor control signal according to an illustrative embodiment.

Figure 3:
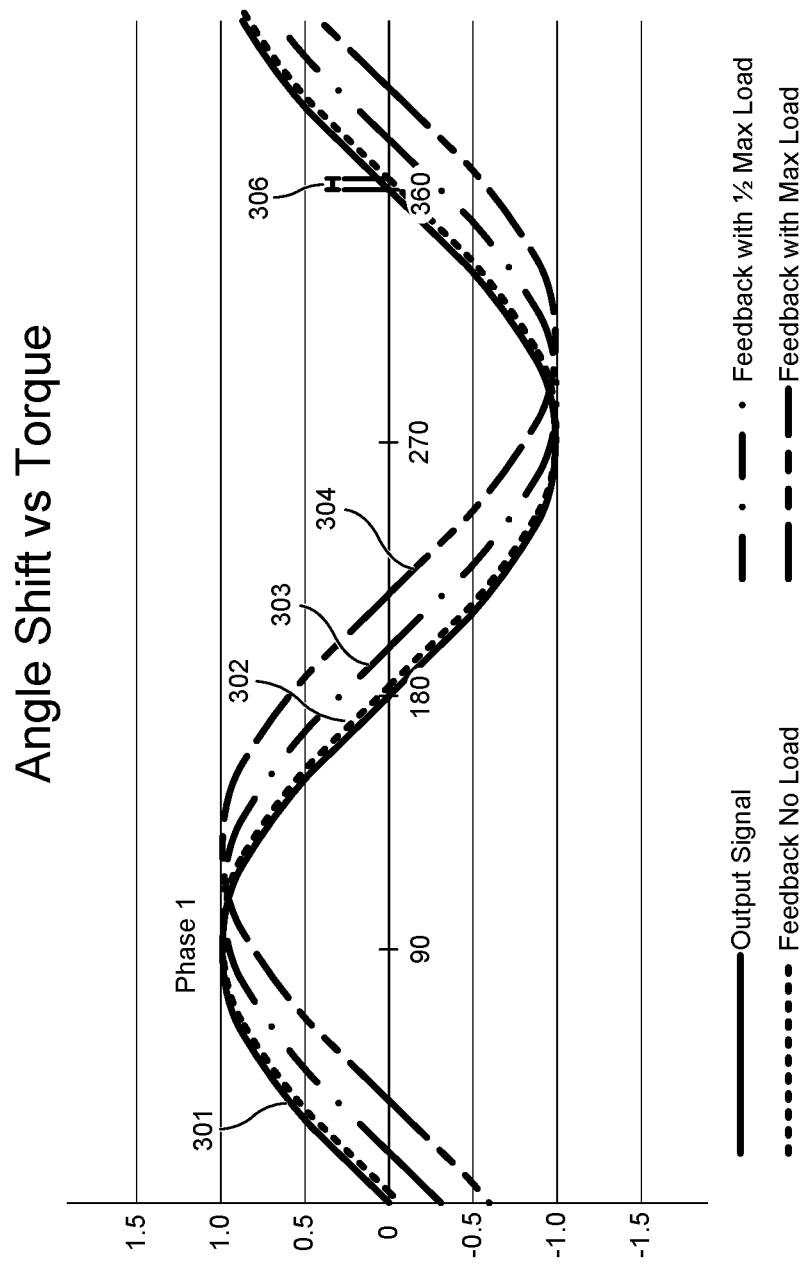

FIG. 3 illustrates sinusoidal waveforms representing one of the phases of the motor control signal in relation to the feedback signals at different loads according to an illustrative embodiment.

Figure 4:
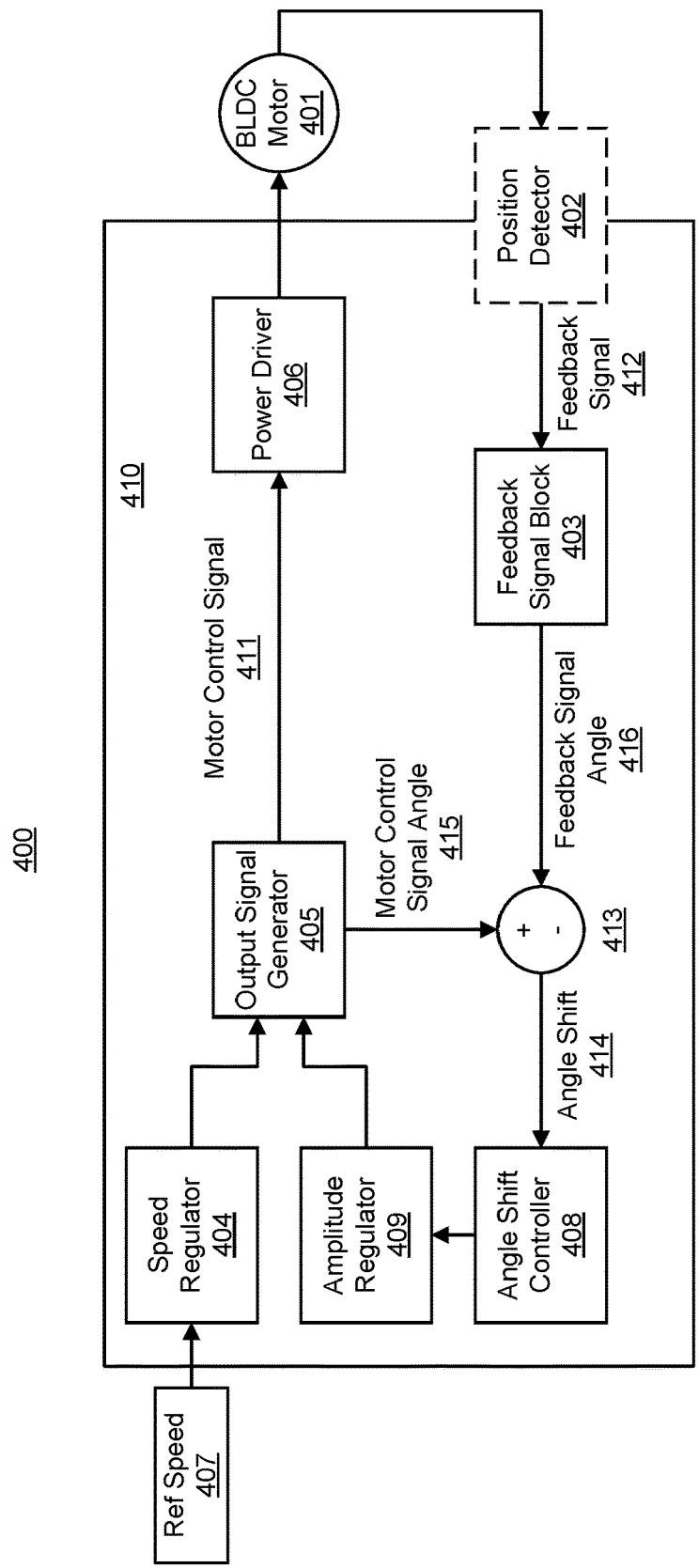

FIG. 4 illustrates a block diagram of the angle shift compensation motor system according to an illustrative embodiment.

Figure 5:
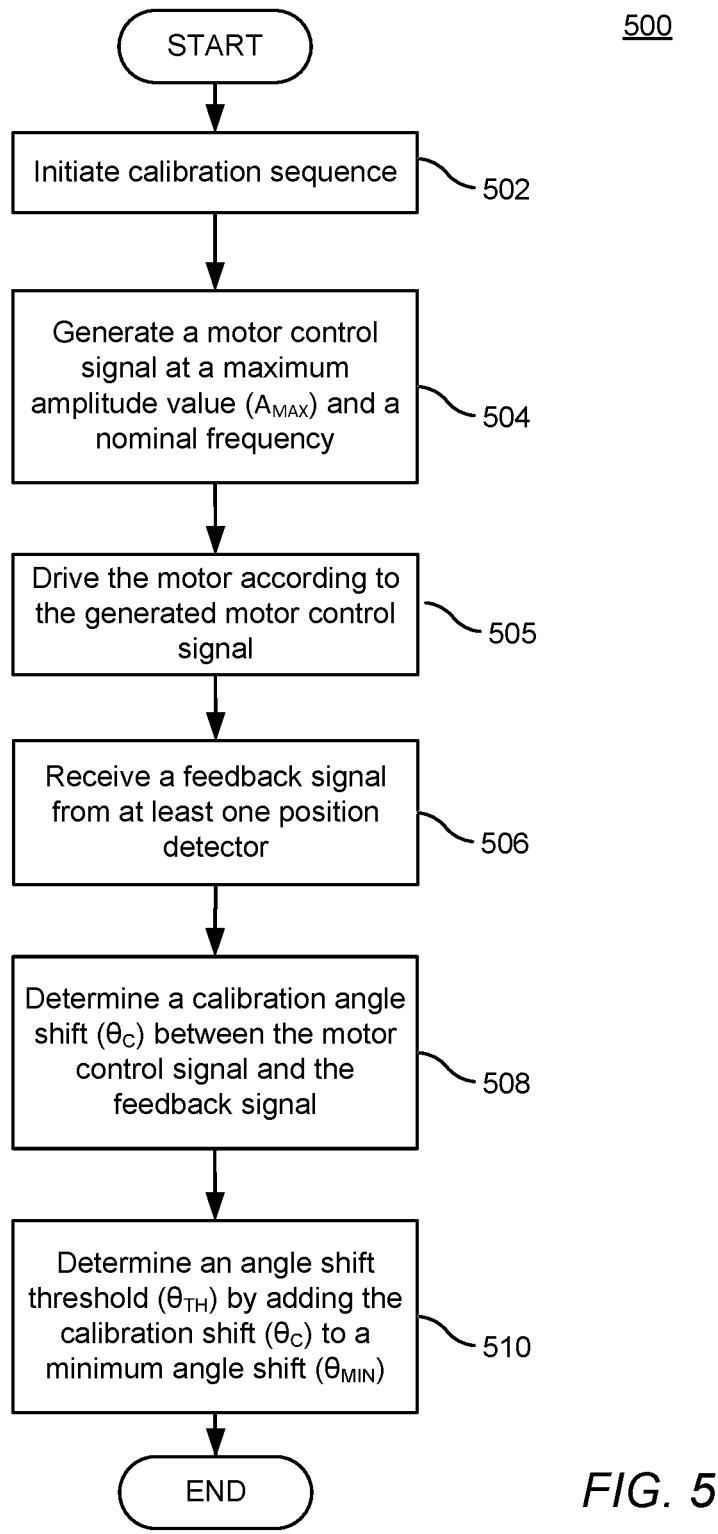

FIG. 5 shows is a flowchart that illustrates a method of calibrating the motor system according to an illustrative embodiment.

Figure 6:
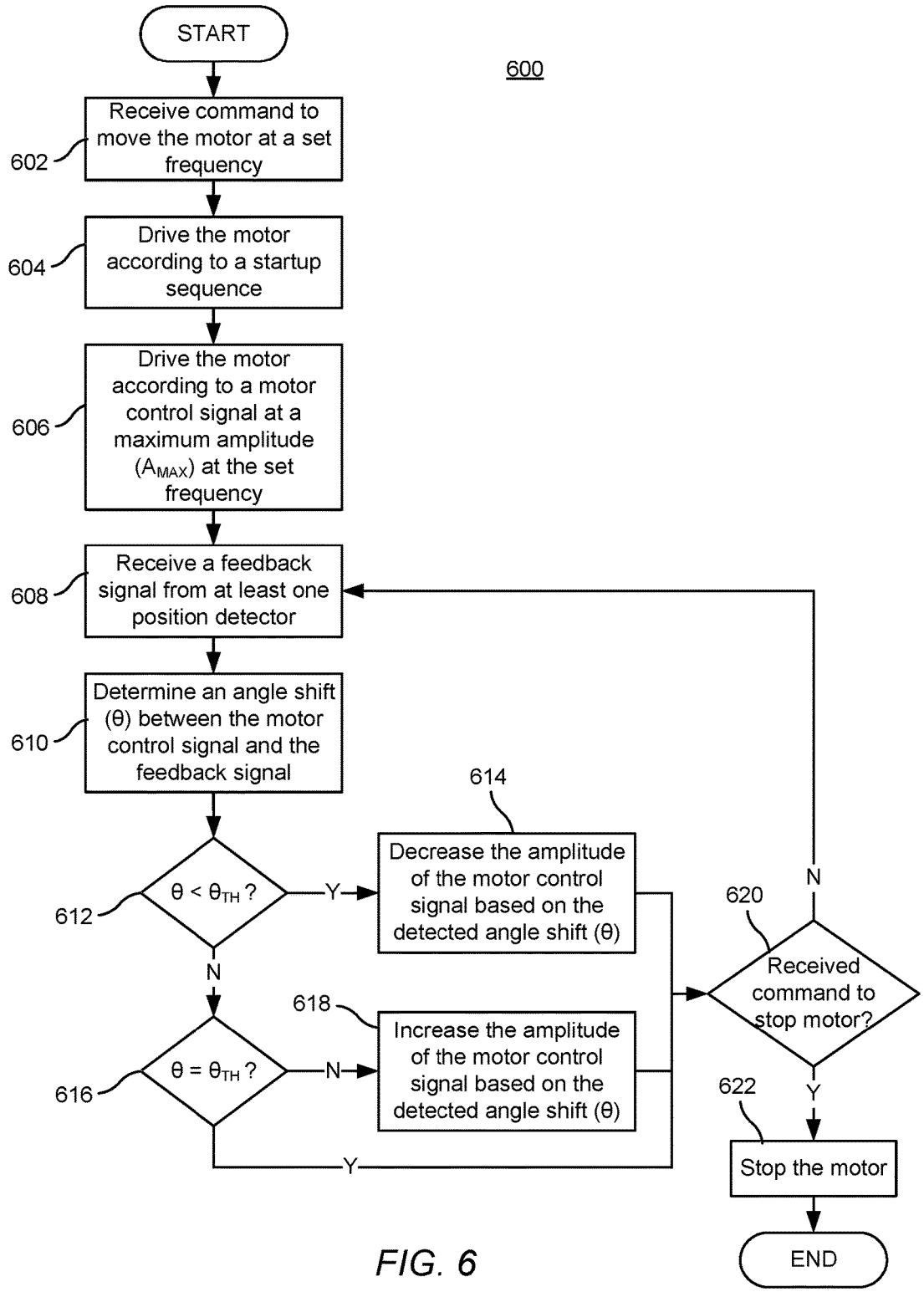

FIG. 6 shows a flowchart that illustrates the angle shift compensation method for controlling the motor system according to an illustrative embodiment.

Figure 7:
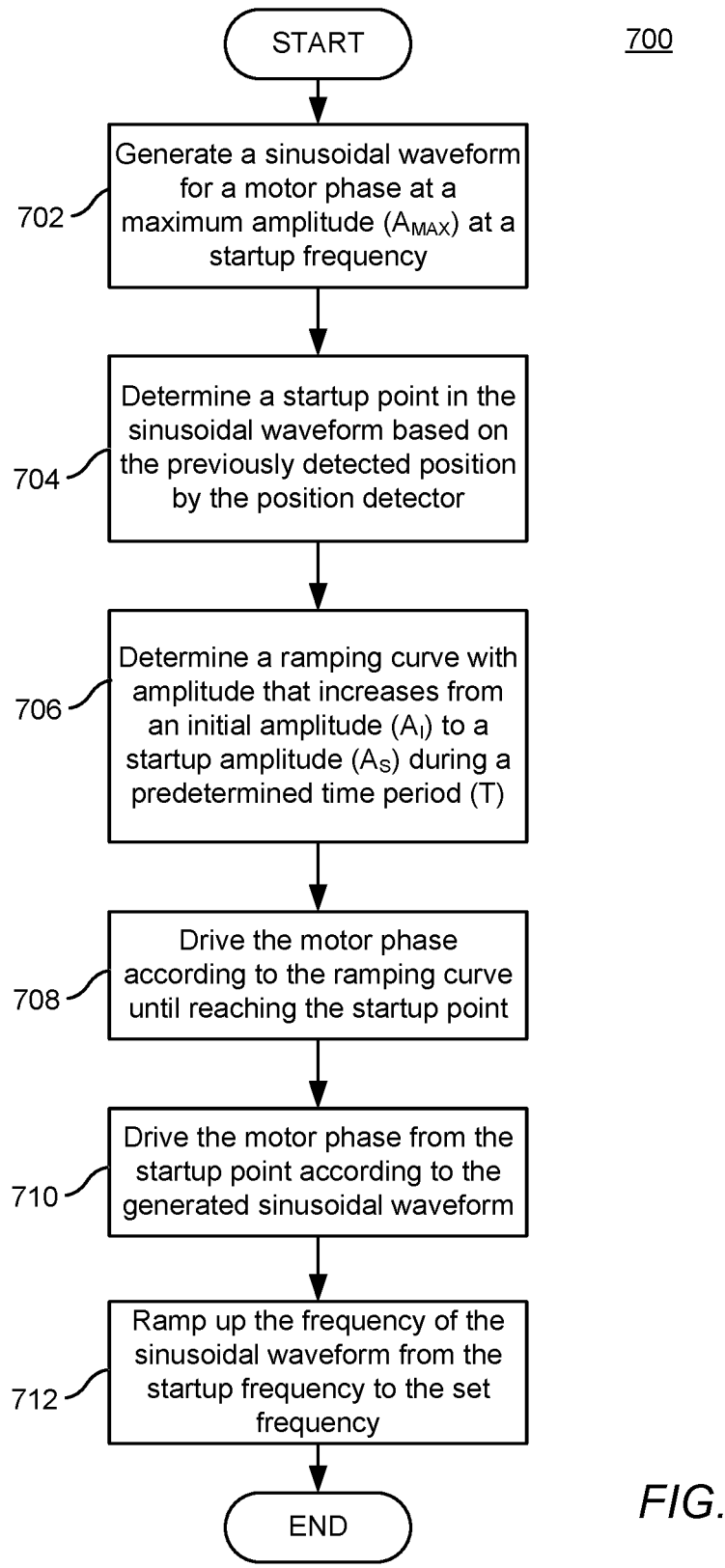

FIG. 7 shows a flowchart that illustrates a motor startup sequence for each motor phase according to an illustrative embodiment.

Figure 8:
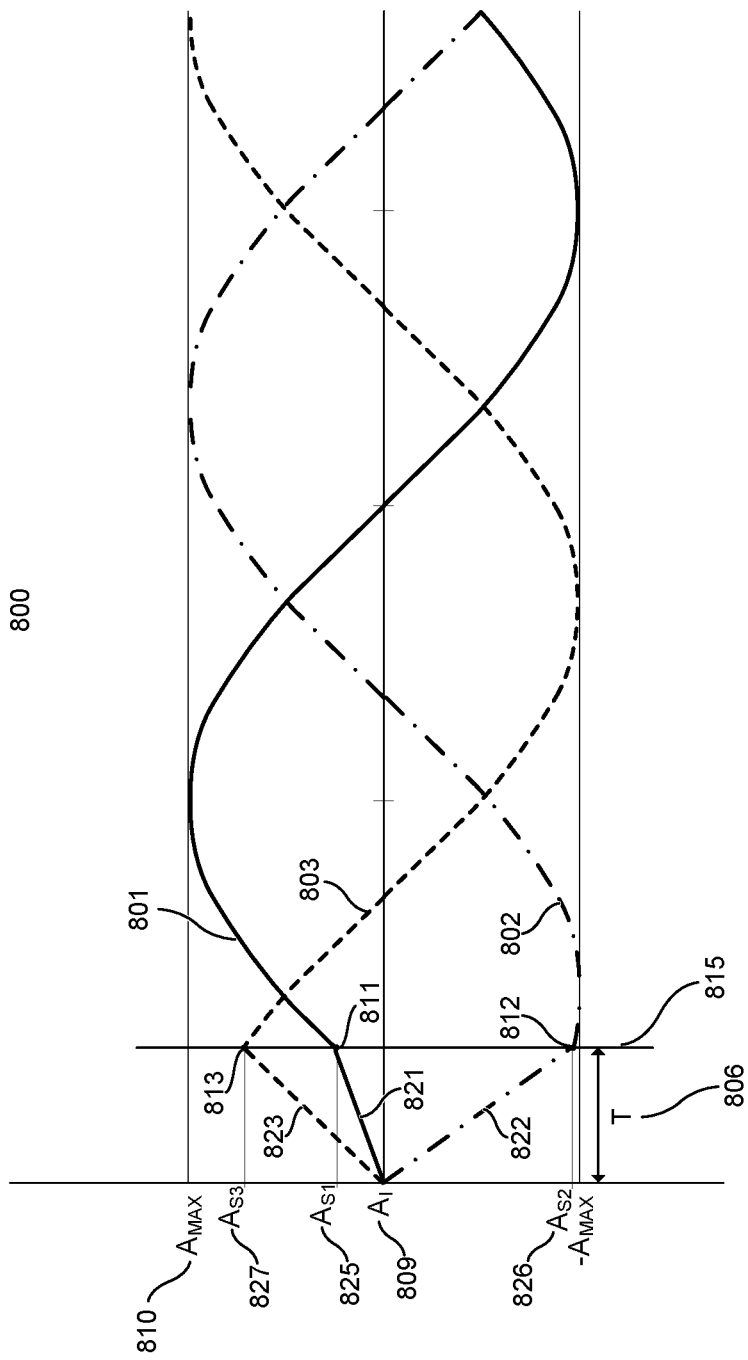

FIG. 8 illustrates sinusoidal waveforms representing the startup sequence according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.

| | |
|---|---|
| 100 | Motor System |
| 101 | Motor |
| 102 | Rotor |
| 103 | Driving Shaft |
| 104 | Permanent Magnet |
| 105a-c | Phase Windings |
| 106a-c | Hall Effect Sensors |
| 107 | Stator |
| 110 | Controller |
| 111 | Motor Control Signal |
| 112 | Feedback Signal |
| 120 | Central Processing Unit (CPU) |
| 122 | Communication Interface |
| 124 | Memory |
| 126 | User Interface |
| 128 | Power Supply |
| 200 | Three Phase Sinusoidal Waveform |
| 201 | First Phase Sinusoidal Wave |
| 202 | Second Phase Sinusoidal Wave |
| 203 | Third Phase Sinusoidal Wave |
| 301 | Sinusoidal Waveform for One of the Phases of the Motor Control Signal |
| 302 | Waveform of a Feedback Signal with No Load |
| 303 | Waveform of a Feedback Signal with About Half the Maximum Load |
| 304 | Waveform of a Feedback Signal with Maximum Load |
| 306 | Angle Offset |
| 400 | Angle Shift Compensation Motor System |
| 401 | Motor |
| 402 | Position Detector |
| 403 | Feedback Signal Block |
| 404 | Speed Regulator |
| 405 | Output Signal Generator |
| 406 | Power Driver |
| 407 | Reference Speed |
| 408 | Angle Shift Controller |
| 409 | Amplitude Regulator |
| 410 | Controller |
| 411 | Motor Control Signal |
| 412 | Feedback Signal |
| 413 | Error Detector |
| 414 | Angle Shift |
| 415 | Motor Control Signal Angle |
| 416 | Feedback Signal Angle |
| 500 | Flowchart That Illustrates a Method of Calibrating the Motor System |
| 502-510 | Steps of Flowchart 500 |
| 600 | Flowchart That Illustrates the Angle Shift Compensation Method for Controlling the Motor System |
| 602-622 | Steps of Flowchart 600 |
| 700 | Flowchart That Illustrates a Motor Startup Sequence for Each Motor Phase |
| 702-712 | Steps of Flowchart 700 |
| 800 | Three Phase Sinusoidal Waveform |
| 801 | First Phase Sinusoidal Wave |
| 802 | Second Phase Sinusoidal Wave |
| 803 | Third Phase Sinusoidal Wave |
| 806 | Predetermined Time Period (T) |
| 809 | Initial Amplitude ($A_I$) |
| 810 | Maximum Amplitude ($A_{MAX}$) |
| 811 | First Startup Point in First Phase Sinusoidal Wave |
| 812 | Second Startup Point in Second Phase Sinusoidal Wave |
| 813 | Third Startup Point in Third Phase Sinusoidal Wave |
| 815 | Startup Time |
| 821 | Ramping Curve for the First Phase |
| 822 | Ramping Curve for the Second Phase |
| 823 | Ramping Curve for the Third Phase |
| 825 | First Startup Amplitude ($A_{S1}$) |
| 826 | Second Startup Amplitude ($A_{S2}$) |
| 827 | Third Startup Amplitude ($A_{S3}$) |

List of Acronyms Used in the Specification in Alphabetical Order

The following is a list of the acronyms used in the specification in alphabetical order.

| | |
|---|---|
| θ | Angle Shift |
| $\theta_C$ | Calibration Angle Shift |
| $\theta_N$ | Determined Angle Shift |
| $\theta_{N+1}$ | New Measured Angle Shift |
| $\theta_{MIN}$ | Minimum Angle Shift |
| $\theta_{TH}$ | Angle Shift Threshold |
| $A_I$ | Initial Amplitude |
| $A_S$ | Startup Amplitude |
| $A_{MAX}$ | Maximum Amplitude |
| AC | Alternating Current |
| ASIC | Application Specific Integrated Circuit |
| BLDC | Brushless Direct Current |
| CPU | Central Processing Unit |
| DC | Direct Current |
| EEPROM | Electrically Erasable Programmable Read-Only Memory |
| IR | Infrared |
| LED | Light Emitting Diode |
| ms | Milliseconds |
| N | North |
| PI | Proportional-Integral |
| PID | Proportional-Integral-Derivative |
| PoE | Power over Ethernet |
| PWM | Pulse Width Modulation |
| RAM | Random-Access Memory |
| RF | Radio Frequency |
| ROM | Read-Only Memory |
| RPM | Revolutions per Minute |
| RPS | Revolutions per Second |
| S | South |
| T | Time Period |
| VFD | Variable-Frequency Drive |
| $W_N$ | Weight of the Determined Angle Shift |
| $W_{N+1}$ | Weight of the New Measured Angle Shift |

Mode(S) for Carrying out the Invention

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of motor control, but is not limited thereto, except as may be set forth expressly in the appended claims. The present embodiments provide for motor control that achieves efficient motion and reduced noise without effecting the frequency or speed of the motor. The present embodiments minimize the irregularities of the control algorithm by making the native motor control variables as independent from the motion feedback as possible and not using special mathematical variable transformation methods. While the embodiments described herein are explained by referencing a Brushless Direct Current (BLDC) motor, it should be noted that the motor control algorithms discussed herein may be applied to any type of sinusoidally driven motors, including but not limited to brushed direct current (DC) motors, outrunner BLDC motors, alternating current (AC) motors, variable-frequency driven (VFD) motors, or the like. In addition, while a three-phased motor is illustrated and described herein, the motor control algorithms discussed herein may be applied to a motor with any number of one or more phases. Accordingly, the motor control signal illustrated and discussed herein may comprise one or more sinusoidal waves corresponding to the number of phases of the motor.

Referring to FIG. 1, there is shown a motor system 100 comprising a motor 101 and a motor controller 110 according to an illustrative embodiment. According to one embodiment, the motor 101 may comprise a BLDC motor, although other types of sinusoidally controlled motors may be utilized. The motor 101 may comprise a rotor 102 and a stator 107. A rotor 102 of a BLDC type motor may comprise a driving shaft 103 and a permanent magnet 104 divided into one to eight, or more, north (N)-south (S) pole pairs. The stator 107 may be positioned about the rotor 102 and may comprise a plurality of steel laminations that carry phase windings 105a-c defining the stator pole pairs. The motor 101 operates via electrical commutation generated by controller 110. Particularly, the controller 110 outputs a motor control signal 111 that sequentially energies the coils in the phase windings 105a-c.

The motor system 100 further comprises at least one position detector adapted to detect or determine the position of the rotor 102 in relation to the stators 105a-c and provide a feedback signal 112 to the controller 110. For illustrative purposes, as shown in FIG. 1, three Hall Effect sensors 106a-c may be utilized, which may be arranged around the rotor 102 to detect the position of the rotor 102 with respect to the stators 105a-c and generate the feedback signal 112. However, other types of position detectors may be utilized to provide the feedback signal 112 without departing from the scope of the present embodiments. For example, the at least one position detector may comprise one or more of a position feedback sensor (such as a Hall Effect sensor, a magnetic position sensor, or the like), a resolver, an encoder (such as an optical encoder, a magnetic encoder, or the like), a current sense circuit, a voltage sense circuit, a back electromotive force (EMF) sense circuit, any combinations thereof, or any other similar position detector capable of determining the position of a rotor with respect of a stator in a motor.

The controller 110 may comprise at least one central processing unit (CPU) 120 that can represent one or more microprocessors, "general purpose" microprocessors, special purpose microprocessors, application specific integrated circuits (ASICs), or any combinations thereof. The controller 110 can provide processing capability to provide processing for one or more of the techniques and functions described herein. The controller 110 can further include an internal memory 124, or alternatively an external memory, communicably coupled to the CPU 120. Memory 124 can store data and executable code, such as volatile memory, nonvolatile memory, read-only memory (ROM), random-access memory (RAM), electrically erasable programmable read-only memory (EEPROM), flash memory, a hard disk drive, or other types of memory.

The controller 110 may comprise a power supply 128 configured for providing power to the various components of the controller 110. The power supply 128 may be connected to a voltage line for receiving an electric alternating current (AC) power signal from an AC mains power source. The power supply 128 may comprise circuit components configured for converting the incoming AC power signal to a direct current (DC) power signal. In another embodiment, the controller 110 may be connected to an external power supply for receiving a DC power signal.

In an embodiment, the controller 110 may comprise a user interface 126, such one or more buttons, configured for enabling calibration and control of the motor 101 by receiving control commands directly from a user. The user interface 126 may further comprise one or more light indicators, such as light emitting diodes (LED), to provide feedback to the status of the motor 101.

In another embodiment, the controller 110 further comprises a communication interface 122, such as a wired or a wireless interface, configured for receiving control commands from an external control point. The wireless interface may be configured for bidirectional wireless communication with other electronic devices, such as the external control point, over a wireless network. The wireless network interface may comprise a radio frequency (RF) transceiver configured for bidirectional wireless communication using wireless communication protocols, such as the ZigBee® protocol, the infiNET EX® protocol from Crestron Electronics, Inc. of Rockleigh, N.J., or the like. In another embodiment, the wireless interface may in addition or alternately comprise an infrared (IR) interface. The wired interface may be configured for bidirectional communication with other devices over a wired network. The wired interface can represent, for example, an Ethernet or a Cresnet® port. Cresnet® provides a network wiring solution for Crestron® keypads, lighting controls, thermostats, and other devices. In various aspects of the embodiments, the communication interface 122 and/or power supply 128 can comprise a Power over Ethernet (PoE) interface. The controller 110 can receive both the electric power signal and the control input from a network through the PoE interface.

The controller 110 may output a motor control signal 111 to the motor 101 comprising at least one sinusoidal wave, each configured to energize a corresponding phase of the motor. For a three-phase motor, the motor control signal 11 may comprise a three phase sinusoidal waveform 200 shown in FIG. 2 having three sinusoidal waves 201-203 across the three phases of the motor 101, which may be 120 degrees out of phase. However, the motor control signal 111 may comprise less or more sinusoidal waves to correspond to the number of phases included in the motor, and the sinusoidal waves may be offset by other number of degrees. The sinusoidal waveform 200 may be synthesized at the controller 110 using pulse width modulation (PWM). The frequency of this waveform 200 may be determined by a linear relation that involves the desired speed of the motor 101 in revolutions per minute (RPM) as well as the given motor parameters.

Beneficially, once a speed is chosen, the controller 110 does not alter the frequency of the motor control signal 111, or the motor speed, based on the feedback of the position detector, such as Hall Effect sensors 106a-c. Locking the frequency in place effectively minimizes the noises caused by the speed compensation algorithms. According to the present embodiments, the motor control signal 111 is synthesized from the controller 110 using PWM and corrected according to outputs of the angle shift compensation algorithm of the present embodiments, as described in greater detail below.

Referring to FIG. 3, there is shown a sinusoidal waveform 301 representing a motor control signal 111 for one of the motor phases for simplification purposes. Waveform 302 represents a feedback signal 112 from the position detector, such as a Hall Effect sensor, showing the position of the rotor 102 in relation with the stator 107 energized by the sinusoidal motor control signal 301 when no load is applied to the motor 101. Although an analog feedback signal 302 is illustrated, the feedback signal can be instead digital. In such an implementation, the feedback signal would appear as a step waveform. As the rotor 102 moves, the position detector corresponding to the motor phase provides the feedback signal 302 that indicates when in time the rotor 102 passed an expected angle mark in comparison to a zero crossing event of the sinusoidal motor control signal 301. Ideally, the angle marks from the feedback signal 302 where there is no load on the rotor 102 should line up with the zero crossing events of the sinusoidal motor control signal 301 if the rotor 102 was perfectly aligned with the Hall Effect sensors. In other words, there should be at least one position detector feedback event per 360 degrees of at least one sinusoidal motor control signal 301 at every zero crossing of the sinusoidal motor control signal 301. However, even without any load, there may still be some angle offset 306 that is typical to a given line of motors, which can also vary from motor to motor. For example, this may be caused by manufacturing tolerances in the components of a BLDC motor 101, including in the Hall Effect sensor placement.

When driving a motor 101 without speed compensation, as the load on the motor 101 increases, and thereby the torque increases, there is an increasing drift in the angle between the motor control signal 301 and the feedback signal (when the input power is kept constant). In a roller shade application, for example, initially, more torque is required to lift the entire weight of a fully unraveled shade material and the hem bar. As the roller tube turns, the shade material wraps around the roller tube, resulting in less shade material hanging from the roller tube, and as a result less torque is required to lift the weight of the remaining shade material. For example, waveform 303 represents a feedback signal from the position detector when there is about half the maximum load exerted on the motor 101. The drift in the angle increases as more load is exerted on the motor 101, as shown by waveform 304 representing a feedback signal from the position detector when the maximum load is exerted on the motor 101.

Controlling the amplitude of the motor control signal 301 while maintaining a constant torque output can adjust the angle between the sinusoidal control signal 301 and the feedback signal to maximize efficiency. Without amplitude control, while the motor runs very quietly, it runs inefficiently because it needs to be driven at its maximum power. If the angle is too shallow, it meant that the motor is being overdriven. On the other hand, if the angle was too wide, the motor can stall.

As such, according to the present embodiments, the frequency of the motor control signal 111 is maintained fixed to keep a constant speed, while the amplitude of the motor control signal 111 is dynamically updated in order to keep the angle shift between the motor control signal 111 and the feedback signal 112 at an angle shift threshold ($\theta_{TH}$). As such, the angle shift compensation algorithm of the present embodiments is more loosely coupled to the position feedback readings. Doing so will maximize the energy efficiency of the motor 101, while minimizing the sudden speed changes caused due to the typical speed feedback compensation during any perturbing torque or any other non-linearity in the motion variables that can disrupt the control system. Locked frequency enables constant speed control not effected by external forces as well as quiet and smooth motor operation. Proper amplitude control on the sinusoidal control signal will keep a constant speed, avoid rotor lag and thereby stall conditions, and keep the commutation of the motor 101 as close as possible to an efficient commutation. Another advantage is that the motor 101 can be driven at a very slow speed, for example at speeds below 10 RPM, while maintaining high efficiency and substantially no noise.

According to an embodiment, the angle shift between the motor control signal 111 and the feedback signal 112 is maintained at an angle shift threshold ($\theta_{TH}$). According to one embodiment the angle shift threshold ($\theta_{TH}$) may be the sum of a predetermined minimum angle shift ($\theta_{MIN}$) and a calibration angle shift ($\theta_C$), which takes into account position detection errors, such as Hall Effect sensor misplacement, such as one shown by angle shift 306 in FIG. 3. Depending on motor system parameters, there is an optimum minimum angle shift ($\theta_{MIN}$) that should be maintained to enable the motor 101 to operate at greater efficiency. The minimum phase angle shift ($\theta_{MIN}$) may be preset based on motor system parameters and stored in motor memory 124. Alternatively, the minimum phase angle shift ($\theta_{MIN}$) may be dynamically updated based on the speed of the motor 101 and detected torque. According to an embodiment, the minimum angle shift ($\theta_{MIN}$) is greater than zero. A very low angle shift, such as one or two degrees of one electrical rotation, would be very inefficient. On the other hand, a higher angle shift, such as 30 degrees of one electrical rotation, runs a risk of locking the rotor where the rotor 102 loses sink with the magnetic field that is trying to push it forward causing an audible and perceivable skip. Once a locked rotor condition occurs, it takes additional current to get the motor 101 back to its original state. According to an embodiment, the minimum phase angle shift ($\theta_{MIN}$) may range between about 15 degrees of one electrical rotation and about 25 degrees of one electrical rotation. The motor 101 will need to be calibrated, as described in greater detail below, to determine the calibration angle shift ($\theta_C$), such as angle shift 306 in FIG. 3, caused by position detection feedback errors, such as Hall Effect sensor misplacement. The determined calibration angle shift ($\theta_C$) is added to the predetermined minimum phase angle shift ($\theta_{MIN}$) to get the angle shift threshold ($\theta_{TH}$).

According to another embodiment, the angle shift threshold ($\theta_{TH}$) may be a predetermined value stored by the motor, or may be a value determined according to other calibration methods. In addition, instead of using the same angle shift threshold ($\theta_{TH}$) for all of the position detectors, there can also be a separate angle shift threshold ($\theta_{TH}$) for each position detector. Regardless of how it is determined, the angle shift threshold ($\theta_{TH}$) is the angle shift between the motor control signal 111 and the feedback signal 112 the controller 110 will try to maintain by raising or lowering the amplitude of the motor control signal 111.

FIG. 4 illustrates a block diagram 400 of the angle shift compensation motor system in greater detail according to an illustrative embodiment. According to an embodiment, the controller 410 comprises a speed regulator 404 that sets the speed of the motor 401 according to a reference speed 407. The reference speed 407 is the desired speed at which to drive the motor 401. The speed regulator 404 determines the fixed frequency for the motor control signal 411 at which to drive the motor 401 using the reference speed 407. To change the speed of the motor 401, a different reference speed 407 may be inputted, thereby changing the fixed frequency of the motor control signal 411 independent of load. But once the speed is chosen, the frequency is set and does not alter based on the position detector feedback 412. To determine the fixed frequency from the reference speed 407, the speed regulator 404 may multiply the reference speed 407 by a factor that takes into account the particular output stage gain of the motor 401 as well as other parameters of the particular motor 401.

The amplitude regulator 409 regulates the amplitude for the motor control signal 411 at which to drive the motor 401. According to an embodiment, at startup, the amplitude for the motor control signal 411 is set to a maximum or high amplitude value ($A_{MAX}$). The output signal generator 405 generates the motor control signal 411 to drive the motor 401 at the fixed frequency set by the speed regulator 404 and the amplitude set by the amplitude regulator 409. The output signal generator 405 also feeds the motor control signal angle 415 of the motor control signal 411 to an error detector 413. The power driver 406 uses the motor control signal 411 from the output signal generator 405 to generate current to excite the stator coils to drive the motor 401.

As the rotor of the motor 401 rotates, at least one position detector 402, such as Hall Effect sensors, determine the position of the rotor in relation to the stator poles and output a feedback signal 412. The feedback signal block 403 turns the feedback signal 412 into a sinusoidal wave signal, from which the feedback signal angle 416 of the rotor position in relation to the stator poles is determined. The error detector 413 receives the feedback signal angle 416 from the position detector 402 as well as the motor control signal angle 415 of the motor control signal 411 from the output signal generator 405. The error detector 413 determines the difference between these angles 416 and 415 to detect the angle shift 414 between the motor control signal 411 and the feedback signal 412.

According to an embodiment, the controller 410 may be constantly measuring the difference between the angle 415 of the motor control signal 411 and the angle 416 of the feedback signal 412 and may determine the angle shift 414 over time using a weighted average filter. According to an embodiment, the controller 410 may use the following formula to determine the new angle shift:

$$\theta_N = \frac{(\theta_N \times W_N) + \theta_{N+1}}{W_{N+1}}$$

where,
$\theta_N$ is the determined angle shift,
$\theta_{N+1}$ is the new measured angle shift,
$W_N$ is the weight of the determined angle shift, and
$W_{N+1}$ is the weight of the new measured angle shift.
The weight of the determined angle shift ($W_N$) may for example comprise 3 and the weight of the new measured angle shift ($W_{N+1}$) may for example comprise 4. Using these weights, every new estimation of the measured angle shift ($\theta_{N+1}$) has a weight of 0.25, where the determined angle shift ($\theta_N$) keeps a weight of 0.75. Other weight values may also be chosen to give more or less weight to the new measured angle shift ($\theta_{N+1}$) or the determined angle shift ($\theta_N$). Using a weighted average estimation makes sure that an instantaneous measured angle shift outlier does not detriment the angle shift determination. As an example, for a constant speed output for a pole pair of a 3 phase motor 401, this update tends to be very constant over 1/24 the time of a full revolution. Meaning that if the motor 401 is set to rotate at 1000 RPM it will yield to 16.6 revolutions per second (RPS), and therefore the position detector 402 will be triggering an event every 2.5 milliseconds (ms), for a given angle shift value, it will take four of these position detected events for the angle shift value ($\theta_N$) to converge to the new value, which is about 10 ms in this case.

The angle shift controller 408 determines the amplitude by which to adjust the motor control signal 411 based on the detected angle shift 414 to minimize the angle shift 414 between the motor control signal 411 and the feedback signal 412. The angle shift controller 408 essentially adjusts the amplitude in proportion to the angle shift 414 until the angle shift 414 reaches an angle shift threshold ($\theta_{TH}$). The compensation algorithm by which the angle shift controller 408 may excite or relax the amplitude may comprise a linear algorithm, a non-linear algorithm, a proportional-Integral (PI) algorithm, a proportional-integral-derivative (PID) algorithm, a fuzzy logic algorithm, other similar algorithms, or any combinations thereof. The relationship between the angle shift and amplitude will very between motor to motor. The factors considered will be dependent and tuned to the motor system being controlled based on the system parameters. The determined amplitude is fed to the amplitude regulator 409 to regulate the amplitude of the motor control signal 411.

After startup, because initially the motor 401 is driven at the maximum amplitude ($A_{MAX}$), the amplitude of the motor control signal 411 would be relaxed back until the angle shift 414 between the motor control signal 411 and the feedback signal 412 reaches the angle shift threshold ($\theta_{TH}$). Thereafter, if the detected angle shift 414 is above the angle shift threshold ($\theta_{TH}$), the angle shift controller 408 may increase the amplitude of the motor control signal 411. If the detected angle shift 414 is below the angle shift threshold ($\theta_{TH}$), the angle shift controller 408 may decrease the amplitude of the motor control signal 411.

For the angle shift compensation algorithm to operate properly, the motor system 100 needs to get calibrated to take into account position detection feedback errors, such as Hall Effect sensor misplacement, which may cause a greater angle shift as discussed above. FIG. 5 is a flowchart 500 that illustrates a method that may be used for calibrating the motor system 100 according to the one embodiment. However, other calibration methods may be utilized without departing from the scope of the present embodiments. For example, in roller shade applications, the motor system 100 may be calibrated at the factory by mounting an assembled roller shade (with the motor system 100 inserted in its roller tube) on a gantry with no shade material or load attached to it. Then, in step 502, the calibration sequence is initiated. This can be initiated upon a first power up of the motor controller 110, or for example by pressing a button on the user interface 126 in communication with the motor controller 110.

In response, in step 504, the motor controller 110 generates a motor control signal 111 at a maximum amplitude value ($A_{MAX}$) with a given nominal frequency or speed. In step 505, the motor controller 110 drives the motor 101 according to the generated motor control signal 111. As such, the motor 101 is driven at full power with no load. In step 506, the motor controller 110 receives a feedback signal 112 from at least one position detector, such as Hall Effect sensors 106a-c, indicating the position of the rotor 102 with respect to the stator 107. In step 508, the controller 110 determines a calibration angle shift ($\theta_C$) between the motor control signal 111 and the feedback signal 112. According to an embodiment, the controller 110 may determine a calibration angle shift ($\theta_C$) by measuring angle shifts between the motor control signal 111 and the feedback signal 112 for a convergence period, for example of about 10 seconds, and correlating this resulting data. In step 510, the controller 110 determines an angle shift threshold ($\theta_{TH}$) by adding the calibration angle shift ($\theta_C$) to a minimum angle shift value ($\theta_{MIN}$). For example, as discussed above, the minimum angle shift value ($\theta_{MIN}$) may comprise about 20 degrees of one electrical rotation. According to a further embodiment, for robustness in determining this offset, the method shown in FIG. 5 may be repeated n-times, where the resulting angle shift threshold ($\theta_{TH}$) has to match within two-degree tolerance.

FIG. 6 is a flowchart 600 that illustrates the angle shift compensation method for controlling the motor system 100 according to one embodiment. In step 602, the controller 110 may receive a control command to move the motor at a set fixed frequency. For example, in a roller shade application, the controller 110 may receive a control command from the user interface 126 or from an external control point, such as a user interface in a form of a keypad, to lower or raise the shade material. The frequency of the motor control signal 111 is determined based on the desired speed. According to one embodiment, the speed and/or the set frequency of the motor 101 may be predetermined or preset and stored in the memory 124 for default or normal operation of the motor 101. According to another embodiment, the speed of the motor 110 may be selected by a user through the user interface 126 or from an external control point. Thereafter, the selected or set frequency of the motor 110 remains fixed, unless it is changed by the user during operation. According to an embodiment, when the user selects a different speed during the operation of the motor 101, instead of changing frequency instantaneously, the motor controller 110 may gradually ramp up or ramp down the frequency from an original frequency to the selected frequency.

According to an embodiment, in step 604, the motor controller 110 initially drives the motor 101 according to a startup sequence. Particularly, in the start of the angle shift compensation method of the present embodiments, the motor 101 needs to be driven at a maximum amplitude value ($A_{MAX}$), which is a relatively high value. If on startup, the motor 101 is instantaneously impulsed with a motor control signal at such maximum amplitude value ($A_{MAX}$), it will likely react with a jolting or clunking sound when the motor rotor 102 locks into a correct position with respect to the stator 107. In order to eliminate this event, a startup sequence is implemented according to the present embodiments to lock the rotor into a known state before starting commutation. This helps to avoid the perceivable "clunk" noise on startup.

Referring to FIG. 7, there is shown a flowchart 700 that illustrates the motor startup sequence for each motor phase according to an illustrative embodiment. In step 702, the controller 110 generates a sinusoidal waveform for a motor phase at a maximum amplitude value ($A_{MAX}$) at a startup frequency, which may be zero or a greater nominal value. Referring to FIG. 8, for a three phase motor, the controller 110 may generate a three phase sinusoidal waveform 800 comprising three sinusoidal waves 801, 802, and 803 at 120 degrees out of phase at a maximum amplitude value ($A_{MAX}$) 810. This maximum amplitude value ($A_{MAX}$) may be set according to a given motor parameters and based on the maximum level of torque anticipated to be driven by the motor 101. According to an embodiment, this maximum amplitude value ($A_{MAX}$) can be determined based on some margin above the previous converged to amplitude. This allows for safer and more efficient operation.

In step 704, for each phase, the controller 110 may determine a startup point in the sinusoidal waveform based on the previously detected position of the motor as reported by the position detector. According to one embodiment, the startup point may be estimated based on the previously detected position. According to another embodiment, the startup point may be more accurately determined using the position detector, such as by an absolute encoder. In particular, the controller 110 stores the last recorded position of the rotor with respect to the stator and uses that position to determine the startup point in the sinusoidal waveform. For a three phase motor, the startup points of the three waveforms may be offset by 120 degrees. For example, referring to FIG. 8, 811 represent an exemplary first startup point of the first phase 801; 812 represent an exemplary second startup point for the second phase 802; and 813 represent an exemplary third startup point for the third phase 803. Each startup point 811, 812, and 813, may be defined by a startup angle shift that aligns with startup time 815 and a startup amplitude value ($A_S$), including a first startup amplitude value ($A_{S1}$) 825, a second startup amplitude value ($A_{S2}$) 826, and a third startup amplitude value ($A_{S3}$) 827.

In step 706, for each phase, the controller 110 determines a ramping curve to ramp up the amplitude from an initial amplitude ($A_1$) to the startup amplitude ($A_S$) of the startup point during a predetermined time period (T). The initial amplitude may comprise zero or some other nominal value. According to an embodiment the predetermined time period (T) may range from about 20 microseconds to about 100 milliseconds. The ramping curve may comprise a linear ramping curve, or it may comprise a non-linear ramping curve, such as a positive or a negative logarithmic curve. The rate of ramp (e.g., slope) of the ramping curve may be relative to the startup amplitude ($A_S$) in relation to the predetermined time period (T). For example, referring to FIG. 8, for the first phase 801 the controller may determine a linear ramping curve 821 for ramping up amplitude from an initial amplitude ($A_1$) 809 to the first startup amplitude ($A_{S1}$) 825 of the startup point 811 during the predetermined time period (T) 806. Similarly, 822 represents the ramping curve for the second phase 802 and 823 represents the ramping curve for the third phase 803. Because each startup point, and thereby each startup amplitude ($A_S$), is different for each phase sinusoidal wave, each ramping curve is also different for its respective phase such that the three phases arrive at their respective startup amplitudes ($A_S$) at the same time 815. According to another embodiment, the curve and slope for each phase may be kept constant such that each phase may arrive at its startup point at a different time.

In step 708, the controller 110 drives each motor phase according to its corresponding ramping curve determined in step 706 until reaching the startup point. Then in step 710, the controller 110 drives each motor phase from the startup point according to the generated sinusoidal waveform. Referring to FIG. 8, effectively, before time 815, the phases are ramped up to startup points 811, 812, and 813, by energizing the coils and increasing the voltage according to the ramping curves 821, 822, and 823 to the desired level. After reaching the startup points 811, 812, and 813, the phases are driven using AC voltage as defined by the sinusoidal waveforms 801, 802, and 803. As such, instead of jumping to the startup points 811, 812, and 813 immediately, the magnetic field is slowly applied to the rotor to less aggressively lock it into the magnetic field before starting to move the magnetic field. This helps to eliminate noise upon startup.

According to an embodiment, during the startup sequence, motor controller 110 may also gradually ramp up the frequency of the sinusoidal waveform from the startup frequency to the set frequency in step 712.

Returning to FIG. 6, in step 606, the controller 110 proceeds to drive the motor according to the motor control signal at the maximum amplitude value ($A_{MAX}$) at the set frequency. Then in step 608, the controller 110 receives a feedback signal 112 from at least one position detector, such as Hall Effect sensors 106a-c, indicating the position of the rotor 102 with respect to the stator 107. In step 610, the controller 110 determines an angle shift (θ) between the motor control signal 111 and the feedback signal 112.

The controller 110 then compares the detected angle shift (θ) to an angle shift threshold ($θ_{TH}$). If the detected angle shift (θ) is smaller than the angle shift threshold ($θ_{TH}$) as determined in step 612, then the controller 110 decreases the amplitude of the motor control signal 111 based on the detected angle shift (θ) in step 614. As discussed above, the controller 110 may decrease the amplitude of the motor control signal 111 in proportion to the detected angle shift (θ) using a linear algorithm, a non-linear algorithm, a proportional-Integral (PI) algorithm, a proportional-integral-derivative (PID) algorithm, a fuzzy logic algorithm, other similar algorithms, or any combinations thereof.

If the controller did not receive a command to stop the motor in step 620, the controller 110 returns to step 608 to continue to monitor the feedback signal 112 and adjust the amplitude of the motor control signal 111 accordingly. Because initially the controller 110 has powered the motor 101 to a maximum amplitude ($A_{MAX}$) in the startup sequence of step 604, the controller 110 will relax the amplitude of the motor control signal 111 back until reaching the angle shift threshold ($θ_{TH}$). According to an embodiment, the controller 110 may be updated with the feedback signal 112 every 10 ms, although other time value may be used.

If in step 616 the controller 110 determines that the detected angle shift (θ) is equal to the angle shift threshold ($θ_{TH}$), and the controller 110 did not receive a command to stop the motor in step 620, the controller 110 does not change the amplitude of the motor control signal 111 and returns to step 608 to continue monitoring the feedback signal 112.

On the other hand, if in step 616 the controller 110 determines that the detected angle shift (θ) is above the angle shift threshold ($θ_{TH}$), for example due to additional load exerted on the motor 101, the controller 110 will increase the amplitude of the motor control signal 111 based on the detected angle shift (θ) in step 618. If no control command was received to stop the motor in step 620, the controller 110 returns to step 608 to continue monitoring the angle shift (θ) and increase or decrease the amplitude of the motor control signal 111 accordingly.

Otherwise, if the controller 110 receives a control command to stop the motor in step 620, the controller 110 stops the motor in step 622 and the shift angle compensation process ends. According to an embodiment, instead of immediately stopping the motor, the motor controller 110 may gradually ramp down the frequency of the sinusoidal waveform from the set frequency to the startup frequency, or some other nominal frequency, before stopping the motor.

INDUSTRIAL APPLICABILITY

The disclosed embodiments provide a system, software, and a method for controlling motors to achieve efficient motion and reduced noise. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A motor control system comprising:
   a motor having a rotor and a stator and comprising at least one phase;
   at least one position detector adapted to detect a position of the rotor with respect to the stator and generate a feedback signal; and
   a controller for controlling the motor, wherein for at least one motor phase the controller is adapted to:
   drive the motor phase with a sinusoidal motor control signal; receive a feedback signal from the at least one position detector; determine an angle shift between the motor control signal and the feedback signal;
   compare the angle shift to an angle shift threshold;
   when the angle shift is below the angle shift threshold, decrease an amplitude of the motor control signal;
   when the angle shift is above the angle shift threshold, increase the amplitude of the motor control signal;
   wherein the controller is further adapted to calibrate the motor control system to determine the angle shift threshold by:
   driving the motor phase with no load using a control signal at a set maximum amplitude value,
   receiving a feedback signal from the at least one position detector;
   determining a calibration angle shift between the motor control signal at the maximum amplitude and the feedback signal; and
   determining the angle shift threshold by adding the calibration angle shift to a predetermined minimum angle shift value.

2. The motor control system of claim 1, wherein the at least one position detector comprises at least one selected from a position sensor, a Hall Effect sensor, a magnetic position sensor, a resolver, an encoder, an optical encoder, a magnetic encoder, a current sense circuit, a voltage sense circuit, a back electromotive force (EMF) sense circuit, and any combinations thereof.

3. The motor control system of claim 1, wherein the controller is further adapted to maintain the motor control signal at a fixed frequency.

4. The motor control system of claim 3, wherein on startup of the motor the controller is further adapted to ramp up a frequency of the motor control signal from a startup frequency to the fixed frequency.

5. The motor control system of claim 1, wherein the controller does not change a frequency of the motor control signal based on the feedback signal from the at least one position detector.

6. The motor control system of claim 1, wherein the controller is adapted to determine a fixed frequency of the motor control signal according to a reference speed.

7. The motor control system of claim 6, wherein the controller is further adapted to change the fixed frequency to a new fixed frequency upon receiving a command indicating a new reference speed.

8. The motor control system of claim 7, wherein the controller changes the fixed frequency by gradually ramping up or ramping down the frequency from the original fixed frequency to the new fixed frequency.

9. The motor control system of claim 1, wherein the controller is further adapted to determine a new angle shift between the motor control signal and the feedback signal by weighing the determined angle shift with respect to a new angle shift measurement.

10. The motor control system of claim 1, wherein the controller is adapted to determine the angle shift using a weighted average estimation.

11. The motor control system of claim 1, wherein the controller proportionally decreases or increases the amplitude of the motor control signal based on the determined angle shift.

12. The motor control system of claim 11, wherein the controller decreases or increases the amplitude of the motor control signal using at least one of a linear algorithm, a non-linear algorithm, a proportional-Integral (PI) algorithm, a proportional-integral-derivative (PID) algorithm, a fuzzy logic algorithm, or any combinations thereof.

13. The motor control system of claim 1, wherein the controller is further adapted to generate the motor control signal in response to a command to move the motor.

14. The motor control system of claim 1, wherein the controller is further adapted to:

generate the motor control signal at a set maximum amplitude value; and drive the motor phase by decreasing the amplitude of the motor control signal based on the determined angle shift until reaching the angle shift threshold.

15. The motor control system of claim 14, wherein the maximum amplitude value comprises a predetermined maximum amplitude value.

16. The motor control system of claim 14, wherein the controller is further adapted to determine the maximum amplitude value based on a previously converged to amplitude.

17. The motor control system of claim 1, wherein for the at least one motor phase the controller is further adapted to perform a startup sequence comprising:

generate the sinusoidal motor control signal comprising a startup point;

initially drive the motor phase by gradually ramping up voltage until reaching the startup point in the motor control signal; and drive the motor phase from the startup point according to the sinusoidal motor control signal.

18. The motor control system of claim 1, wherein for the at least one motor phase the controller is further adapted to perform a startup sequence comprising:

generate the sinusoidal motor control signal comprising a set amplitude and a startup point, wherein the startup point comprises a startup amplitude;

determine a ramping curve with amplitude that increases from an initial amplitude to the startup amplitude;

drive the motor phase according to the ramping curve until reaching the startup point; and drive the motor phase from the startup point according to the generated sinusoidal motor control signal.

19. The motor control system of claim 18, wherein the set amplitude value comprises a predetermined amplitude value.

20. The motor control system of claim 18, wherein the controller is further adapted to determine the set amplitude value based on a previously converged to amplitude.

21. The motor control system of claim 18, wherein the startup amplitude comprises a predetermined startup amplitude value.

22. The motor control system of claim 18, wherein the startup amplitude is determined from a detected load.

23. The motor control system of claim 18, wherein the controller is further adapted to determine the startup point based on previously detected position by the at least one position detector.

24. The motor control system of claim 18, wherein the startup point defines a startup angle shift in the sinusoidal motor control signal.

25. The motor control system of claim 18, wherein the ramping curve comprises a function of increasing voltage from the initial amplitude to the startup amplitude during a predetermined time period.

26. The motor control system of claim 18, wherein the ramping curve comprises at least one of a linear ramping curve, a non-linear ramping curve, a positive logarithmic curve, a negative logarithmic curve, and any combinations thereof.

27. The motor control system of claim 18, wherein the initial amplitude comprises zero.

28. The motor control system of claim 18, wherein the initial amplitude comprises a nominal value greater than zero.

29. The motor control system of claim 1, wherein the angle shift threshold comprises a value greater than zero.

30. The motor control system of claim 1, wherein the minimum angle shift comprises a range of about 15 degrees of one electrical rotation to about 25 degrees of one electrical rotation.

31. The motor control system of claim 1, wherein the calibration angle shift is an estimated measurement of the at least one position detector misplacement with respect to the rotor.

32. The motor control system of claim 1, wherein the controller determines the calibration angle shift by continuously measuring angle shifts between the motor control signal at the maximum amplitude and the feedback signal for a convergence period and correlating the measured angle shifts.

33. A motor control system comprising:

a motor having a rotor and a stator and comprising at least one phase;

at least one position detector adapted to generate a feedback signal indicating a position of the rotor with respect to the stator; and a controller for controlling the motor, wherein for at least one motor phase the controller is adapted to:

generate a sinusoidal motor control signal at a maximum amplitude value;

receive a feedback signal from the at least one position detector; determine an angle shift between the motor control signal and the feedback signal;

compare the angle shift to an angle shift threshold;

decrease the amplitude of the motor control signal based on the determined angle shift until reaching the angle shift threshold; and monitor the angle shift between the motor control signal and the feedback signal and proportionally adjust the amplitude of the motor control signal to maintain the angle shift substantially at the angle shift threshold wherein the controller is further adapted to calibrate the motor control system to determine the angle shift threshold by:

driving the motor phase with no load using a control signal at a set maximum amplitude value;

receiving a feedback signal from the at least one position detector;

determining a calibration angle shift between the motor control signal at the maximum amplitude and the feedback signal; and determining the angle shift threshold by adding the calibration angle shift to a predetermined minimum angle shift value.

34. A motor control system comprising:

a motor having a rotor and a stator and comprising at least one phase;

at least one position detector that generates a feedback signal indicating a position of the rotor with respect to the stator; and a controller for controlling the motor, wherein for at least one motor phase the controller is adapted to:

drive the motor phase with a sinusoidal motor control signal; monitor an angle shift between the motor control signal and the feedback signal; and proportionally adjust an amplitude of the motor control signal based on the monitored angle shift to maintain the angle shift substantially equal to an angle shift threshold;

wherein the controller is further adapted to calibrate the motor control system to determine the angle shift threshold by:
driving the motor phase with no load using a control signal at a set maximum amplitude value;
receiving a feedback signal from the at least one position detector;
determining a calibration angle shift between the motor control signal at the maximum amplitude and the feedback signal; and
determining the angle shift threshold by adding the calibration angle shift to a predetermined minimum angle shift value.

35. A method for controlling a motor comprising the steps of:
driving a motor phase of the motor with a sinusoidal motor control signal;
receiving a feedback signal from at least one position detector indicating a position of a rotor with respect to a stator of the motor;
determining an angle shift between the motor control signal and the feedback signal;
comparing the angle shift to an angle shift threshold;
when the angle shift is below the angle shift threshold, decreasing an amplitude of the motor control signal;
when the angle shift is above the angle shift threshold, increasing the amplitude of the motor control signal;
wherein the controller is further adapted to calibrate the motor control system to determine the angle shift threshold by:
driving the motor phase with no load using a control signal at a set maximum amplitude value;
receiving a feedback signal from the at least one position detector;
determining a calibration angle shift between the motor control signal at the maximum amplitude and the feedback signal; and
determining the angle shift threshold by adding the calibration angle shift to a predetermined minimum angle shift value.

36. A method for controlling a motor comprising the steps of:
driving a motor phase of the motor with a sinusoidal motor control signal;
receiving a feedback signal from at least one position detector indicating a position of a rotor with respect to a stator of the motor;
monitoring an angle shift between the motor control signal and the feedback signal; and
proportionally adjusting an amplitude of the motor control signal based on the monitored angle shift to maintain the angle shift substantially equal to an angle shift threshold;
wherein the controller is further adapted to calibrate the motor control system to determine the angle shift threshold:
driving the motor phase with no load using a control signal at a set maximum amplitude value;
receiving a feedback signal from the at least one position detector;
determining a calibration angle shift between the motor control signal at the maximum amplitude and the feedback signal; and
determining the angle shift threshold by adding the calibration angle shift to a predetermined minimum angle shift value.

* * * * *